Feb. 1, 1966 R. R. HAINES 3,232,025
HEAT SEALING APPARATUS
Filed April 4, 1962 3 Sheets-Sheet 2
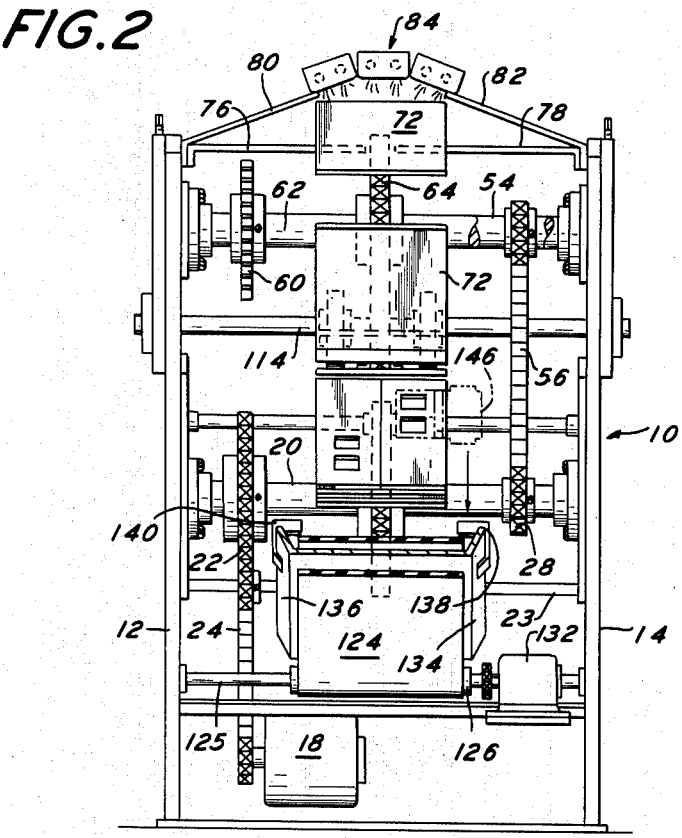
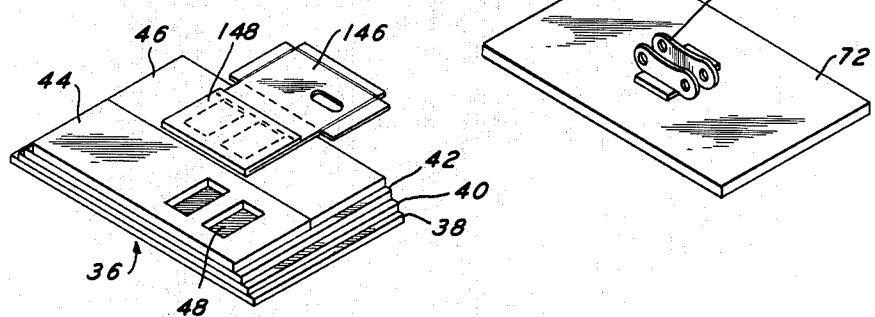
INVENTOR.
RUSSELL R. HAINES
BY
ATTORNEY

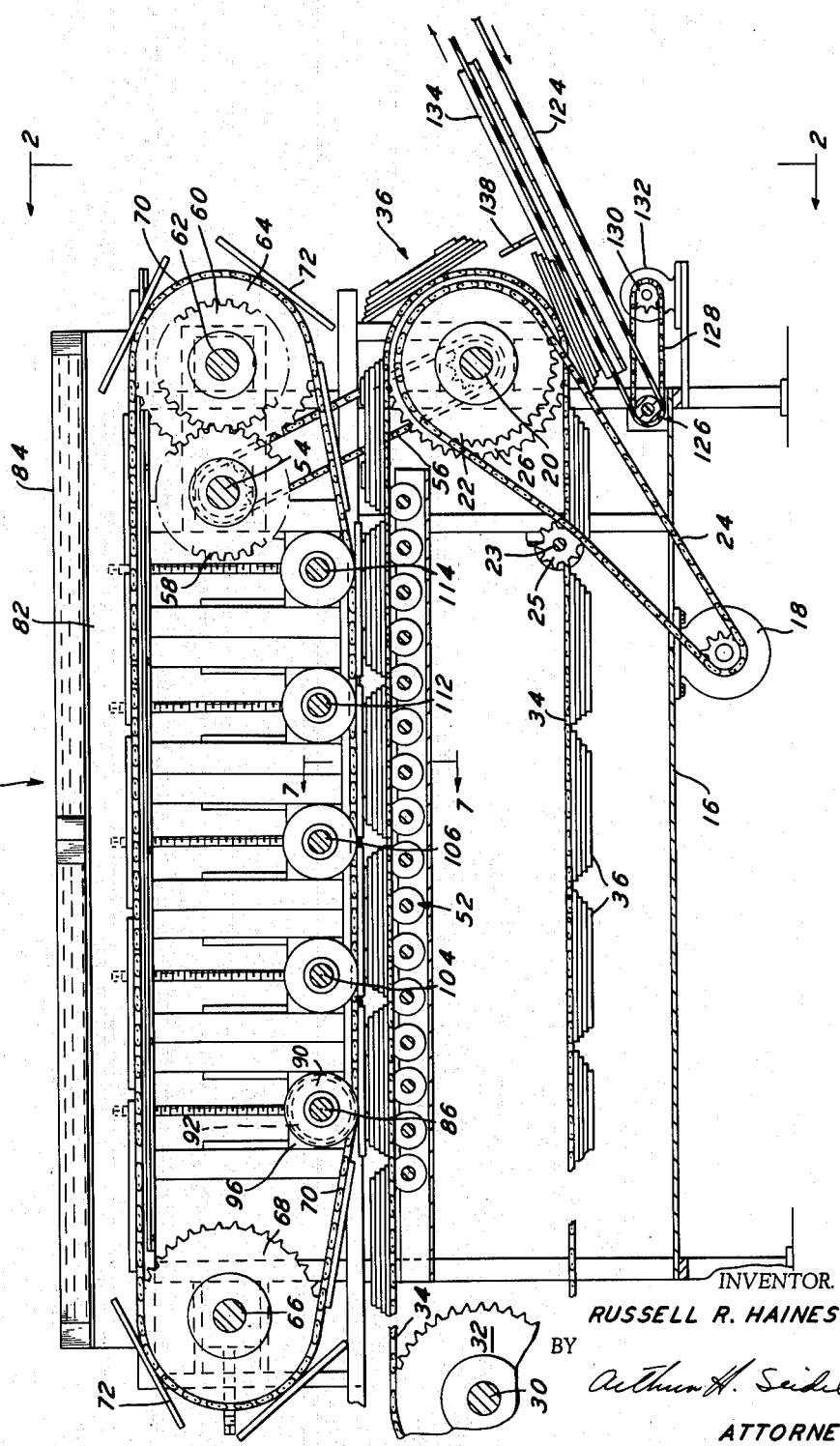

INVENTOR.
RUSSELL R. HAINES

United States Patent Office 3,232,025
Patented Feb. 1, 1966

3,232,025
HEAT SEALING APPARATUS
Russell R. Haines, 312 Randle Court, Braclay Farms,
Haddonfield, N.J.
Filed Apr. 4, 1962, Ser. No. 185,092
7 Claims. (Cl. 53—373)

This invention relates to a heat sealing apparatus, and more particularly, to a heat sealing apparatus which is capable of continuously heat sealing workpieces thereby increasing the rate at which workpieces are heat sealed.

A wide variety of heat sealing devices have been proposed heretofore. As a general rule, heat sealing devices apply heat and pressure to a workpiece to effect a bond between two layers of material or two portions of a single layer of material. All known heat sealing devices proposed heretofore suffer from a common defect or disadvantage. That is, the devices proposed heretofore are limited in their productive capacity.

The heat sealing apparatus of the present invention overcomes the disadvantage of the prior art devices by using endless conveyors which are continuously operative. In operation, the only variable effecting productive capacity is the speed of the conveyors. An operative embodiment of the present invention is presently heat sealing 6,000 workpieces per hour.

In order for heat to be applied to the workpiece, it has been conventional heretofore to design a platen in such a manner so that electric heating coils or steam may be disposed therewithin. Such a structural interrelationship unnecessarily complicates the heat sealing apparatus and is a constant source of maintenance problems. The present invention overcomes the disadvantage of the prior art by utilizing platens which are radiantly heated during a portion of their cycle. In this manner, I have greatly simplified the means for heating the platens and position the heating means so that it may be readily accessible when maintenance thereon is required.

It is an object of the present invention to provide a novel heat sealing apparatus.

It is another object of the present invention to provide a novel heat sealing apparatus capable of continuously heat sealing workpieces.

It is another object of the present invention to provide a novel heat sealing apparatus wherein two endless belts are juxtaposed to one another so that workpieces may be heat sealed continuously.

It is another object of the present invention to materially simplify the heat sealing platen and the means for heating the same.

It is still another object of the present invention to provide a novel means for applying pressure to the platen while the platen is juxtaposed to a workpiece supported in a die plate.

It is still another object of the present invention to provide a novel heat sealing apparatus which is automatically and continuously operable to form a bond between two layers of treated paper materials.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a longitudinal sectional view of the heat sealing apparatus of the present invention.

FIGURE 2 is a view taken along the lines 2—2 in FIGURE 1.

FIGURE 3 is a perspective view of a die plate having a workpiece supported on a portion thereof.

FIGURE 4 is a perspective view illustrating the lower surface of a platen.

Figure 5:
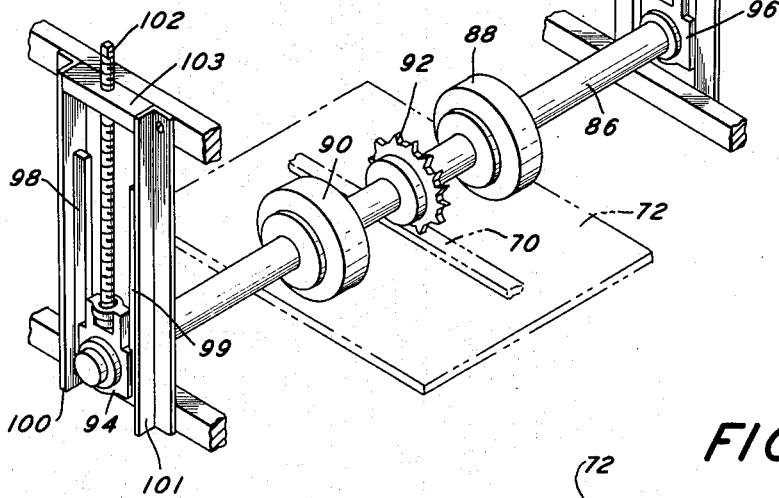
FIGURE 5 is a perspective view illustrating the first set of pressure rollers and the reciprocal bearings therefor.

Referring to the drawing in detail, wherein like numerals indicate like elements, there is shown in FIGURES 1 and 2 a heat sealing apparatus designated generally as 10.

The heat sealing apparatus 10 is composed of a pair of side frame structures 12 and 14 interconnected in any convenient manner. The side frame structures 12 and 14 are a network of reinforcement members which may have a thin outer shell or housing superimposed thereover for aesthetic purposes as well as for preventing the entrance of foreign matter into the apparatus. For the purposes of the present discussion, no such outer shell is illustrated.

The apparatus 10 is provided with a bottom wall 16 to which is secured a motor 18. A horizontally disposed shaft 20 is rotatably supported at its ends by suitable bearings secured to the side frame structures 12 and 14. A sprocket 22 is fixedly secured to the shaft 20. An endless chain 24 extends around a sprocket on the output shaft of the motor 18 and the sprocket 22.

As shown more clearly in FIGURE 1, the sprocket 22 is substantially greater in diameter than the sprocket on the output shaft of the motor 18. A shaft 23 extends horizontally between the side frame structures 12 and 14. An idler sprocket 25 is fixedly secured to the shaft 23 and is in meshing engagement with the chain 24. The idler sprocket 25 may be adjusted to maintain the tension in the chain 24.

A large sprocket 26 is fixedly secured to the shaft 20 substantially equidistant the ends of the shaft 20. The sprocket 26 is slightly larger than the sprocket 22. A sprocket 28 is secured to the shaft 20 adjacent the side frame structure 14. The sprocket 28 is smaller than the sprockets 22 and 26 and the function thereof will be made clear hereinafter. As shown at the lefthand end of FIGURE 1, a horizontally disposed shaft 30 is rotatably supported by any convenient structure such as an extension of the side frame structures 12 and 14. A sprocket 32 is fixedly secured to the shaft 30 at a point substantially equidistant its ends so as to be in line with a sprocket 26. An endless chain 34 extends around the sprockets 26 and 32. A plurality of article support devices 36 are secured to the chain 34 at spaced points therealong. As shown more clearly in FIGURE 7, the lowermost layer of the article support devices 36 in a metal plate 38 having one link of the chain 34 fixedly secured to its lowermost surface.

A layer of wood 40 is fixedly secured to the metal plate 38. A layer of wood 42 is removably secured to the layer of wood 40 and is adapted to be separated therefrom as will be made clear hereinafter. A pair of die plates 44 and 46 are secured to the layer of wood 42. Each of the die plates 44 and 46 are provided with one or more apertures 48. The purpose of the apertures will be made clear hereinafter. The die plates 44 and 46 are preferably a cork neoprene composition capable of resisting compression and heat. As a result of this composition, I have found that the hardness of the die plates increases with increases in temperature. When the workpieces to be heat sealed are sensitive, I have found it desirable to coat the die plates 44 and 46 with a white neoprene coating.

The provision of a pair of die plates 44 and 46 automatically results in the heat sealing of two workpieces at the same time. Where the workpieces are of substantial size, it may be necessary to utilize only one such die plate for each article support device 36. The die plates 44 and 46 may be removably secured to the layer of wood 42 by an adhesive or the like. The layer of wood 42 extends beyond the periphery of the die plates 44 and 46 so as to provide a surface through which nails may be driven to secure the layer of wood 42 to the layer of wood 40. When substituting one die for another, the layer of wood 42 may be separated from the layer of wood 40 by merely inserting a screwdriver between the layers and applying sufficient pressure to separate the same. I have found that this structural interrelationship results in a means for rapidly changing die plates when desired. In order to provide a die plate which is capable of performing its intended function in a temperature range between 200° F. and 300° F., I have found that the die plates 44 and 46 should have a thickness of approximately one-half inch.

Figure 7:
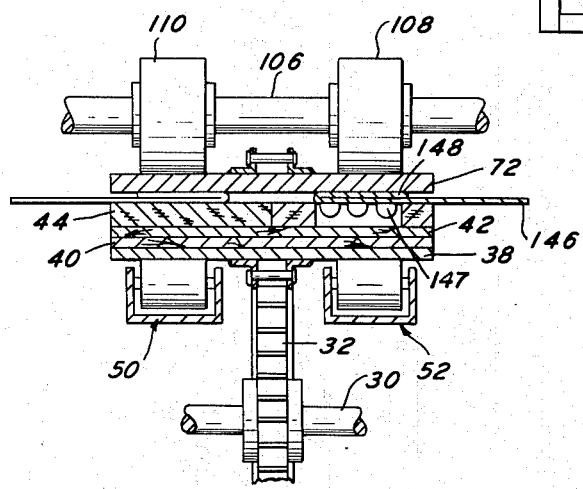
FIGURE 7 is a sectional view taken along the lines 7—7 in FIGURE 1.

As shown more clearly in FIGURES 1 and 7, a set of back up rollers 50 and 52 are provided on opposite sides of the chain 34. Each set of back up rollers includes a plurality of rollers rotatably supported about a horizontal axis at spaced points therealong by means of a channel member supported from one of the side frame structures 12 and 14. The lowermost surface on the metal plate 38 is adapted to be in abutting rolling engagement with the rollers of each set during a portion of the cycle wherein heat and pressure is being applied to the workpieces supported by the die plates.

As shown more clearly in FIGURES 1 and 2, a shaft 54 is rotatably supported for rotation about a horizontal axis by means of bearings supported by the side frame structures 12 and 14. A sprocket is fixedly secured to the shaft 54. The last mentioned sprocket is identical in size with the sprocket 28. An endless chain 56 extends around the two last mentioned sprockets. Hence, the shafts 20 and 54 will rotate at the same speed in the same direction. A large gear 58 is fixedly secured to the shaft 54 adjacent the side frame structure 12. The gear 58 is in meshing engagement with a gear 60. The gear 60 is fixedly secured to a shaft 62. The shaft 62 is disposed above and parallel to the shaft 20. The shaft 62 is rotatably supported at its ends by bearings supported by the side frame structures 12 and 14.

The gears 58 and 60 are identical in size. Hence, the shaft 62 will be rotating at the same speed as the shaft 20, but in opposite directions. A sprocket 64 is fixedly secured to the shaft 62 substantially equidistant the ends thereof so as to be in line with the sprocket 26. The sprockets 64 and 26 are identical in size.

A shaft 66 is rotatably supported by end bearings mounted on the side frame structures 12 and 14. The shaft 66 is adapted to rotate about a horizontal axis. A sprocket 68 is fixedly secured to the shaft 66 substantially equidistant its ends. The sprocket 68 is identical in size with the sprocket 64 and is in line therewith. An endless chain 70 is in meshing engagement with the sprockets 64 and 68. A plurality of platens 72 are secured to the chain 70 at spaced points therealong. The spacing between the platens 72 corresponds generally with the spacing between the metal plates 38 on the chain 34. The chains 34 and 70 are orientated so that one platen 72 will overlie one of the article support devices 36 during a portion of the cycle. As shown more clearly in FIGURE 4, each platen 72 is provided with a link 74 of the chain 70 on its lowermost surface.

The platens 72 are preferably heat sinks. In order to function as heat sinks, the platens 72 should be made from steel. In this regard, I have found that aluminum is completely unsatisfactory for the platens 72.

As shown more clearly in FIGURES 1 and 2, the platens 72 will be radiantly heated during a portion of the cycle when they are removed from the position juxtaposed to one of the article support devices 36. As shown more clearly in FIGURE 2, a pair of reflector shelves 76 and 78 are supported on opposite sides of the chain 34 and below the level or plane of the platens 72 during this portion of the cycle. The reflector shelves 76 and 78 cooperate with reflector walls 80 and 82 to form a triangular housing having a bank of radiant heaters 84 disposed at the apex of the triangular housing. As the platens 72 pass below the bank of radiant heaters, they are heated to any desired temperature. The temperature to which the platens are heated may be varied by controlling the source of current for the bank of heaters and/or controlling the speed of travel of the platens 72.

As shown more clearly in FIGURES 1 and 5, a shaft 86 is rotatably supported by bearings 94 and 96 at its terminal ends. The shaft 86 is provided with a pair of spaced pressure rollers 88 and 90. A sprocket 92 is secured to the shaft 86 between the rollers 88 and 90. Each of the bearings 94 and 96 are identical. Hence, only one bearing need be described in detail.

The bearing 94 is provided with oppositely disposed grooves. Each groove is adapted to receive one of the ribs 98 and 99. The rib 98 is integrally secured to a channel member 100. The rib 99 is integrally secured to a channel member 101. The channel members 100 and 101 are supported by the side frame structure 12. A threaded rod 1022 is threadedly engaged with a cross member 103 and extends into a recess in the bearing 94 to limit the upward movement of the bearing 94.

As shown more clearly in FIGURE 1, the shaft 86 is the first pressure roller shaft beneath which the workpieces will be transported. A plurality of such pressure roller shafts are provided. Hence, pressure roller shafts 104 and 106 having pressure rollers thereon are supported at spaced points in the same manner as shaft 86. A sprocket comparable to sprocket 92 need only be provided on the shaft 86. As shown more clearly in FIGURE 7, the shaft 106 is provided with spaced rollers 108 and 110. The rollers on each of the pressure roller shafts will be disposed so that they apply pressure to the platens 72 in the vertical planes containing the apertures 48 and the sets of back up rollers 50 and 52.

A similar set of pressure roller shafts 112 and 114 are provided as illustrated in FIGURE 1. The horizontal distance between the axis of rotation of the shaft 114 and the axis of rotation of the shaft 62 must be greater than the length of the platens 72. I have found it desirable to have the axis of rotation of the various pressure roller shafts to be spaced apart for a distance which is less than the length of the platens 72 thereby assuring that two sets of pressure rollers will be in rolling engagement with each platen 72.

A working example of the distances between the above mentioned shafts may be as follows: The shafts 86, 104, 106, 112 and 114 may be on nine inch centers. The platens 72 may have a length of ten inches. The distance between the axis of rotation of the shaft 114 and the shaft 62 may be twelve inches.

Figure 6:
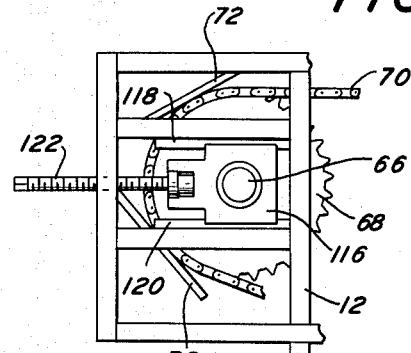
FIGURE 6 is a partial elevation view illustrating the means for adjusting the tension in one of the conveyors of the present invention.

The tension in the chain 70 may be selectively varied by means of the elements illustrated in FIGURE 6. Each end of the shaft 66 may be supported in a bearing 116. The bearing 116 may be provided with grooves on opposite surfaces thereof which are adapted to receive ribs 118 and 120. The bearing 116 is slidably disposed on and guided by the ribs 118 and 120. A threaded rod 122 may be in threaded engagement with an upright portion of the side frame structure supporting the ribs 118 and 120. One end of the threaded rod 122 may be rotatably supported by the bearing 116. As the threaded rod 122 is rotated, the bearing 116 is caused to reciprocate along the ribs 118 and 120 thereby increasing or decreasing the tension in the chain 70 depending upon the direction of rotation of the rod 122.

A conveyor means may be provided to receive the heat sealed workpieces and convey the same to a remote point where other manufacturing processes such as assembling and packaging are performed. Such conveyor means may include a conveyor belt 124 extending around a roller 126. As shown more clearly in FIGURE 2, the roller 126 is supported by a rotatably mounted shaft 125. The shaft 125 has a sprocket affixed thereto. An endless chain 128 extends around the last mentioned sprocket and sprocket 130 on the output shaft of motor 132. Guide plates 134 and 136 are supported along opposite sides of the conveyor belt 124. The last mentioned plates may be interconnected by an integral portion extending through the loop formed by the endless belt 124. Strippers 138 and 140 are supported by the guide plates 134 and 136 in a position so that they automatically strip the workpieces from the support device 36 so that such workpieces may be conveyed to a remote point by means of the belt 124.

Figure 8:
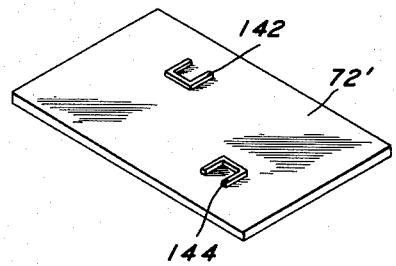
FIGURE 8 is a perspective view of another embodiment of a platen which may be utilized with the present invention.

As shown more clearly in FIGURE 8, the platen 72' may be provided with raised portions 142 and 144. The raised portions 142 and 144 are the only portions of the platen 72' which will be in contact with the workpieces when the workpieces are disposed between a platen and a support device 36. The raised portions may be U-shaped as illustrated in FIGURE 8 thereby resulting in a U-shaped heat seal. Such a heat seal will automatically result in the provision of a pocket thereby enabling printed matter associated with the workpieces to be inserted therein. Likewise, the provision of raised portions on the platens is often desirable where the articles being packaged are sensitive to substantial amounts of heat.

The distance between the shafts 20 and 30 is preferably substantially larger than the distance between the shafts 62 and 66. In a working embodiment of the present invention, the distance between the shafts 20 and 30 is approximately twice the distance between the shafts 62 and 66. This enables a work assembly platform to be provided to the left of the structure illustrated in FIGURE 1. Operators may be disposed along the work assembly platform to place workpieces on the support devices 36 prior to the passage of said workpieces beneath the chain 70.

The operation of the apparatus 10 is as follows:

Prior to starting operation of the motor 18, the bank of heaters 84 should be connected to a supply of current so that they may attain their operating temperature. The support devices 36 in the region of the work performing platform will be provided with a workpiece. For purposes of illustration, the workpiece may be a paper blank 146 having a tab 148. An article 147 to be packaged within a carton formed from the blank 146 may be disposed in a manner so that it extends from a support sheet (not shown) through an aperture in the blank 146 into the apertures 48. The support sheet for the articles 147 will be between the tab 148 and the juxtaposed portion of the blank 146.

The blank 146 may be of the type which is provided with a very thin transparent coating of heat sealing material capable of being bonded to itself when subjected to pressure and a temperature between 200° F. and 300° F.

With the motor 18 running, it will be noted that both of the chains 34 and 70 will be moving in the same direction at the same rate of speed. With the apparatus 10 properly orientated so that each platen will be juxtaposed to one of the support devices 36 in the zone between the shafts 86 and 114, production may commence. The workpieces in the form of blanks 146 having articles 147 such as pharmaceutical products extending through an opening therein will be loaded by operators as shown in FIGURE 3. As the workpieces pass beneath the rollers on the various shafts 86, 104, 106, 112 and 114, pressure is applied by the rollers to force the previously heated platens against the tab 148 as illustrated in FIGURE 7. The reciprocally mounted rotary bearings for the various roller shafts enable variations in thicknesses of the workpieces to be accommodated. The pharmaceutical product 147 or the like will be disposed within the apertures 48 in the die plates 44 and 46.

The pressure and heat is continuously applied to the workpieces until the workpieces have passed beneath the rollers on shaft 114. Thereafter, the platens 72 and support devices 36 separate as illustrated more clearly in FIGURE 1.

As the platens 72 continue through their cycle, they are subjected to radiant heat as they pass beneath the bank of heaters 84. As the support devices 36 continue through their cycle, the blanks 146 are removed from the above mentioned disposition and stripped by means of the strippers 138 or 140. The blanks 146 contact the strippers when their respective support devices 36 are substantially upright. When the workpieces are stripped from their dispositions on the die plates 44 or 46, they fall due to gravity onto the conveyor belt 124 and are conveyed to a remote location where other manufacturing steps may be accomplished.

Conveyor speed, the thickness of the material of the workpieces, and the length of time required to effect a heat seal, are the only variables effecting the rate of production. In a working embodiment of the present invention, the chains 34 and 70 are driven at a speed so that the workpieces are subjected to heat and pressure for 4½ seconds. However, since the operation of the apparatus 10 is continuous, heat sealed workpieces are continuously delivered to the conveyor belt 124.

When the article supported by the blank 146 is heat sensitive, a platen such as platen 72' will be utilized. The raised portions 142 and 144 will provide a particularly shaped heat sealed joint between the tab 148 and the juxtaposed portion of the blank 146. It will be appreciated that the raised portions 142 and 144 may be removably secured to one of the platens 72 thereby obviating the necessity to have a complete set of platens 72 and a complete set of platens 72'. When the blank 146 is made from a sensitive paper, a suitable coating such as white neoprene may be applied to the upper surface of the die plates 44 and 46.

Hereinafter, the chain 34 and its associated sprockets and drive means may be referred to as a first endless conveyor having die plates thereon at spaced points therealong. Hereinafter, the chain 70 and its associated sprockets and drive means may be referred to as a second endless conveyor having platens thereon at spaced points therealong. Hereinafter, the rollers on the various roller shafts may be referred to as a means for biasing each platen into abutting contact with a workpiece on one of the die plates associated with the first endless conveyor.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising first and second endless conveyors juxtaposed to one another, a plurality of spaced article support devices on said first conveyor, a plurality of platens on said second conveyor, means for biasing each platen into abutting contact with a workpiece supported by a separate one of said support devices as said support devices move through an operative portion of their cycle, means for radiantly heating each platen during an inoperative portion of its cycle, said article support devices including die plates, each die plate being made from a heat and compression resistant material, each die plate having an aperture for receiving articles adapted to be heat sealed within the workpiece.

2. Apparatus in accordance with claim 1 including a mechanical means for stripping workpieces from the article support devices and receiving such stripped workpieces for transportation to a remote point.

3. Apparatus in accordance with claim 1 wherein said biasing means includes a plurality of pressure rollers rotatably supported within said second conveyor and in abutting contact with a surface of each platen during an operative portion of the cycle for each platen, each pressure roller is supported by a shaft, each of said last mentioned shafts being supported in bearings mounted for vertical reciprocation.

4. Apparatus in accordance with claim 1 wherein the means for heating said platens includes a bank of electrical radiant heaters, and means supporting said bank of heaters above said second conveyor to radiantly heat said platen.

5. Apparatus in accordance with claim 4 wherein said platens are provided with raised portions so that only the raised portions contact the workpieces, thereby providing a controlled zone on the workpieces which will be subjected to heat and pressure.

6. Apparatus in accordance with claim 1 wherein said biasing means includes a plurality of pressure rollers rotatably mounted about spaced horizontally disposed axes, the distance between adjacent axes being less than the length of the platens.

7. Apparatus for continuously heat sealing packages comprising a first endless conveyor having a plurality of die plates thereon at spaced points therealong, a second endless conveyor above said first mentioned conveyor, said second endless conveyor being substantially shorter than said first mentioned conveyor, said second endless conveyor having a plurality of heat sink platens at spaced points therealong, means for driving each conveyor in the same direction at substantially the same rate of speed, means for biasing separate ones of said platens toward separate ones of said die plates, and means above said second conveyor for radiantly heating platens during a portion of their cycle.

References Cited by the Examiner
UNITED STATES PATENTS

| | | | |
|---|---|---|---|
| 2,106,740 | 2/1938 | Hepke | 93—27 |
| 2,107,249 | 2/1938 | Hepke | 156—583 |
| 2,263,691 | 11/1941 | Enkur | 53—39 |
| 2,747,757 | 5/1956 | Golubski | 156—583 |
| 3,101,898 | 8/1963 | Mader | 53—273 |
| 3,151,428 | 10/1964 | Mader et al. | 53—373 |

EARL M. BERGERT, *Primary Examiner.*